(12) United States Patent
Levin et al.

(10) Patent No.: US 11,481,478 B2
(45) Date of Patent: Oct. 25, 2022

(54) ANOMALOUS USER SESSION DETECTOR

(71) Applicant: Microsoft Technology Licensing, LLC, Redmond, WA (US)

(72) Inventors: Roy Levin, Haifa (IL); Naama Kraus, Haifa (IL); Andrey Karpovsky, Kiryat Motzkin (IL); Tamer Salman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 514 days.

(21) Appl. No.: 16/366,390

(22) Filed: Mar. 27, 2019

(65) Prior Publication Data

US 2020/0311231 A1    Oct. 1, 2020

(51) Int. Cl.
| | | |
|---|---|---|
| G06F 21/31 | (2013.01) | |
| G06F 16/906 | (2019.01) | |
| G06N 20/00 | (2019.01) | |
| G06N 3/08 | (2006.01) | |
| H04L 9/40 | (2022.01) | |

(52) U.S. Cl.
CPC .......... *G06F 21/316* (2013.01); *G06F 16/906* (2019.01); *G06N 3/08* (2013.01); *G06N 20/00* (2019.01); *H04L 63/102* (2013.01); *H04L 63/1425* (2013.01)

(58) Field of Classification Search
CPC ..... G06F 21/316; G06F 16/906; G06N 20/00; G06N 3/08; H04L 63/102; H04L 63/1425
See application file for complete search history.

(56) References Cited

U.S. PATENT DOCUMENTS

| | | | |
|---|---|---|---|
| 6,334,121 B1 | 12/2001 | Primeaux et al. | |
| 9,798,883 B1* | 10/2017 | Gil | G06F 21/577 |
| 2017/0140279 A1* | 5/2017 | Turgeman | H04W 12/06 |
| 2018/0069867 A1* | 3/2018 | Grajek | H04W 12/062 |

OTHER PUBLICATIONS

"International Search Report and Written Opinion Issued in PCT Application No. PCT/US20/015364", dated Jun. 8, 2020, 08 Pages.

\* cited by examiner

*Primary Examiner* — Hee K Song
(74) *Attorney, Agent, or Firm* — Wade IP Law PLLC

(57) ABSTRACT

An anomalous user session detector is disclosed. A sequence of operations in a logon session for an authorized user is gathered. A supervised learning model is trained to identify the authorized user from the sequence of operations. An anomalous session is detected by querying the supervised learning model.

20 Claims, 4 Drawing Sheets

Fig. 2
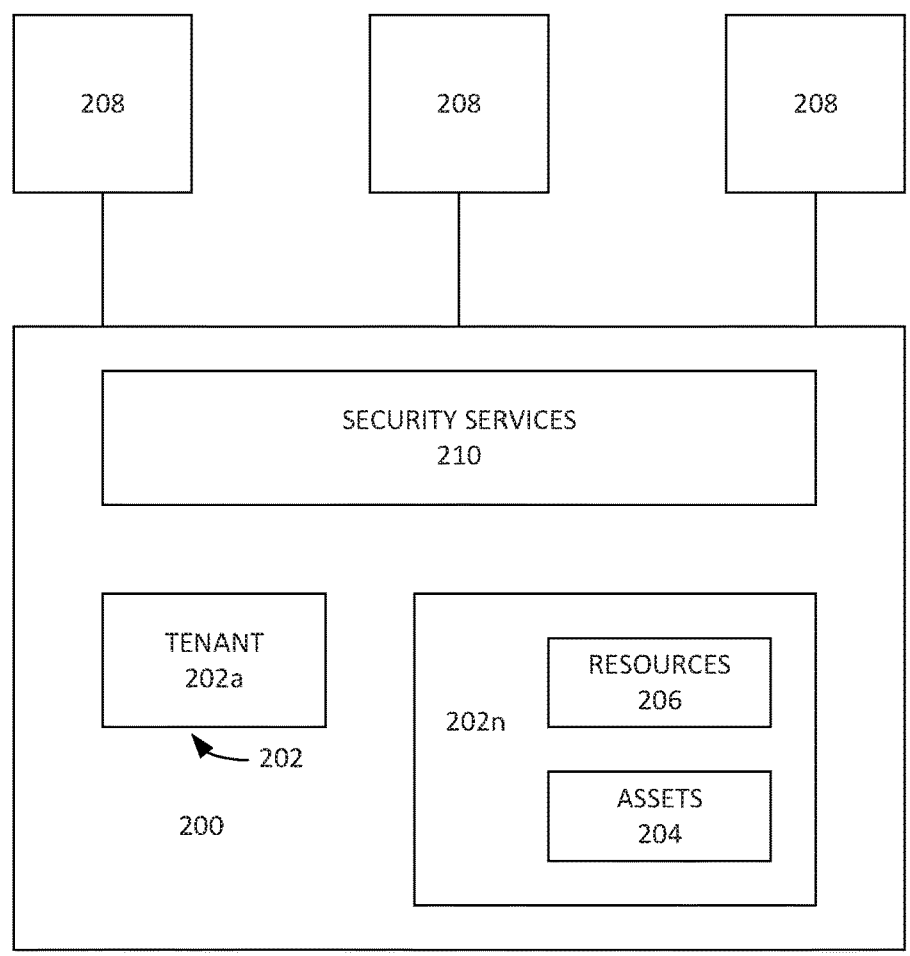
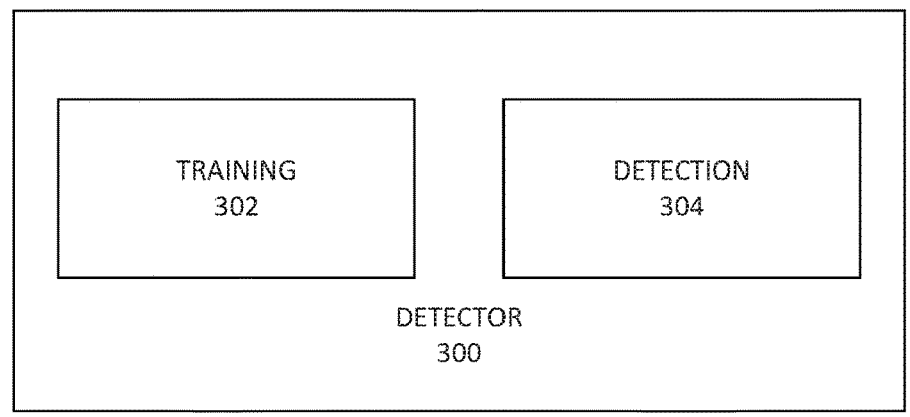
Fig. 3

ANOMALOUS USER SESSION DETECTOR

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications. Cloud computing may include security services that can protect resource and assets from attack.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The present disclosure is directed to an anomalous user session detector. In one example, the anomalous user session detector includes a training component and a detection component. The training component can learn the typical behavior of an authorized user in a logon session, and the detection component can identify deviations to the typical behavior in a logon session to determine whether a user in the logon session is the authorized user. Based on the atypical behavior of the logon session, the detection component can take an action from a set of responses.

In one example, anomalous user session detector can be implemented as part of an infrastructure or platform as a service such as for a cloud tenant or as a software as a service for other clouds. In one example, the anomalous user session detector can be implemented as a computer program to run a processor or computing device, such as a server in a datacenter. In one example, of the anomalous user session detector, a sequence of operations in a logon session for an authorized user is gathered. A supervised learning model is trained to identify the authorized user from the sequence of operations. An anomalous session is detected by querying the supervised learning model. The detector may take a security action if a prospect that the user of the anomalous session is not the authorized user is outside of a threshold amount.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 2 is a schematic diagram illustrating an example a cloud-computing environment.

FIG. 3 is a schematic diagram illustrating an example anomalous user session detector, which can be included as a service in the cloud computing environment of FIG. 2.

DESCRIPTION

Figure 1:
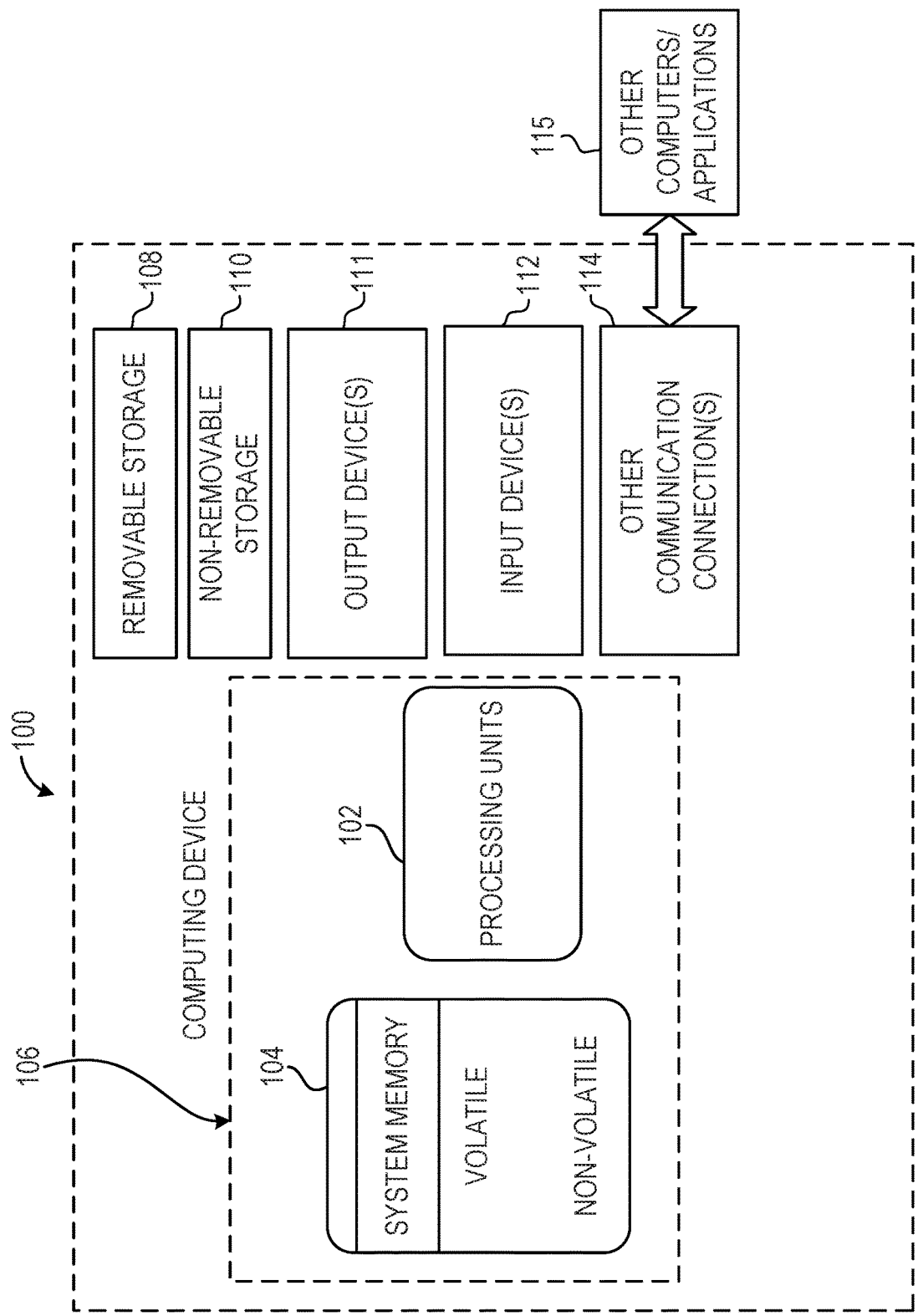
FIG. 1 is a block diagram illustrating an example of a computing device, which can be configured in a computer network to provide, for example, a cloud-computing environment.

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

A hybrid cloud is a deployment model that includes two or more clouds, such as private clouds, public clouds, and community clouds or combinations of two or more of each deployment model, that remain unique entities. Hybrid clouds include technology to bind together the two or more clouds, and in some examples permit data and application portability across clouds, such as cloud bursting for load balancing, and service interoperability.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

FIG. 2 illustrates an example a cloud-computing environment 200, such as a public cloud, to deploy applications and data on a platform and infrastructure across selected datacenters. In the illustrated example, the environment 200 can provided capability to a cloud tenant 202, such as one or more cloud tenants 202a-202n, to deploy applications and data as cloud-based assets 204 to the cloud computing environment 200 and address infrastructure issues. The environment 200 includes, or includes access to, resources 206 available from one or more resource providers. A resource 206 can include a component of the application to be provisioned in a platform subscription and provides an item of the platform solution. Examples of resources 206 can include virtual machines, databases, virtual networks, and others. Resources 206 can be user-managed entities, entities automatically managed by a platform with the cloud environment 200, or a combination of user-managed and automatically managed entities. Resource providers include services that provide resources for the cloud-based assets 204. Resource providers include services to create, configure, and manage operations for working with the resource 206. Examples of resource providers include a compute provider to supply a virtual machine resource, storage provider to supply a storage account resource, web provider to supply resources related to web applications, and other resource providers.

Cloud tenants 202a-202n typically can communicate with other devices, including each other or with devices 208 located outside the cloud environment 200 via a network, such as the internet. In one example the cloud tenants 202a-202n can communicate with other devices via assigned network addresses, such as an assigned internet protocol (IP) addresses. In one example, a user of a device 208 can log in to a cloud tenant of cloud tenants 202a-202n, and access cloud-based assets 204 and resources 206 from the cloud environment 200. In some examples, the cloud-based assets 204 or resources 206 are available to authorized users, and the user may have further restrictions via permissions from a set of permission levels to each authorized user for each resource in the cloud environment 200. The cloud environment can also include a manager or service that provisions user accounts, tracks user accounts, and logs events or operations of the users via the accounts.

Cloud environment 200 also includes security services 210 to protect and secure the cloud-based assets 204 and resources 206 from malicious communication or other threats. In one example, the security services 210 can include controls to manage and configure the security of the assets 204 and resources 206 in order to customize the security for the tenants 202a-202n. Security services 210 can include isolation features to prevent unauthorized or unintentional transfer of data between deployments of a multi-tenant architecture. Additionally, security services 210 can include network and endpoint protection in the form of firewalls and virtual firewalls. For example, security services 210 can include a network group virtual firewall feature to control network traffic to instances of virtual machines. Additionally, security service 210 can provide for logging and monitoring events including security-related events with agents on each compute, storage, or fabric node in environment. Security services 210 can include a computer readable storage device, such as a suite of computer readable storage devices, to store computer executable instructions to control a processor, such as a server in a datacenter. For example, security services 210 can be implemented as part of an infrastructure or platform as a service such as for a cloud tenant 202a, 202n.

A cloud tenant may permit user access to the assets 204 and resources 206 via one or more user accounts. In one example, a user can access a cloud tenant of the cloud tenants 202a-202n with a device of devices 208 through the security services 210. For instance, the user may enter a username and password associated with the account on device 208 to an authentication server or similar service for authentication and demonstration that the user is an authorized user with the credentials for privileges to access the cloud tenant. Once authenticated, the user can perform operations on the tenant in a machine session or service session, or simply session, until the user logs off the cloud tenant. The operations can include a sequence of commands and, for example, can include a sequence of process-creation events or a sequence of resource CRUD (Create, Read, Update, Delete) operations. In some examples, these operations may be recorded in logs such as a resource manager log and attributed to the user account or other credentials. In other examples, the security services 210 may generate a log of operations attributed to the user account or credentials.

In one example, security services 210 attempts to mitigate or prevent malicious activity in the cloud tenants from attackers. In some cases, an attacker may attempt to perform unauthorized or malicious actions via the operations in a session. For example, an attacker may include an unauthorized user who is using the access credentials of an authorized user, or the attacker may include an authorized user with malicious intent such as a malicious insider. One type of attack mitigation is based on rules defined by a security expert. For example, the rules may define or capture patterns of known attacks. These rules are continuously or periodically updated and maintained as known attacks become disseminated among security experts. Such attack mitigation, however, is not well suited to detect newly developed or previously undefined attacks. Further, attackers can modify known attacks to avoid detection. Another type of attack mitigation is based on detecting irregular operations or sets of operations during the session. Such attack mitigation, however, is prone to false positives because the detected irregular operations are often considered without context, which can be difficult to analyze. Additionally, such attack mitigation is susceptible to false negatives as attackers can disguise irregular operations in a series of seemingly benign commands.

FIG. 3 illustrates an anomalous user session detector 300, which in one example, can be incorporated into security services 210. The anomalous user session detector 300 can include a computer readable storage device to store computer executable instructions to control a processor, such as a server in a datacenter. In one example, anomalous user session detector 300 can be implemented as part of an infrastructure or platform as a service such as for a cloud tenant 202a, 202n. In another example, anomalous user session detector 300 can be implemented as a software as a service such as for subscribers in other clouds, hybrid clouds, or private networks. In one example, the anomalous user session detector can be implemented as a computer program to run a processor.

The anomalous user session detector 300 includes a training component 302 and a detection component 304. The training component 302 can learn the typical behavior of an authorized user in a logon session, and the detection component 304 can identify deviations to the typical behavior in a logon session to determine whether a user in the logon session is the authorized user. Based on the atypical behavior of the logon session, the detection component 304 can take an action from a set of responses.

The anomalous user session detector 300 can be applied to a cloud tenant of the cloud tenants 202a-202n, and the training component 302 can be applied to each cloud tenant to train a supervised learning model to identify a user, such as an authorized user, based on a sequence of operations within a logon session to the cloud tenant. The detection component 304 is applied to a logon session and queries the trained model of the training component 302 to determine the prospect, such as the probability, of the logon session as being performed by the alleged user, such as the authorized user, or the user who supplied the access credentials. Depending on the determined prospect that the alleged user is performing the logon session, the detection component 304 can generate a response including allow the session to proceed, request additional credentials from the user, and terminate the session. The detection component 304 can also alert other aspects of security services 210 including alerting security administrators. For example, if the operations performed in a logon session are a selected degree of atypical, the detection component 304 can issue a request to the user to provide additional authentication and alert additional features in security services 210; and if the operations performed in the logon session are highly atypical and possibly malicious, the detection component 304 can terminate the session and alert additional features in security services 210. In one example, the detection component can allow the session to proceed without a response if the prospect that the alleged user is within a threshold amount of the trained model. The anomalous user detector 300 can provide anomaly detection by logon session multi-label classification in which the authorized users for the labels.

Figure 4:
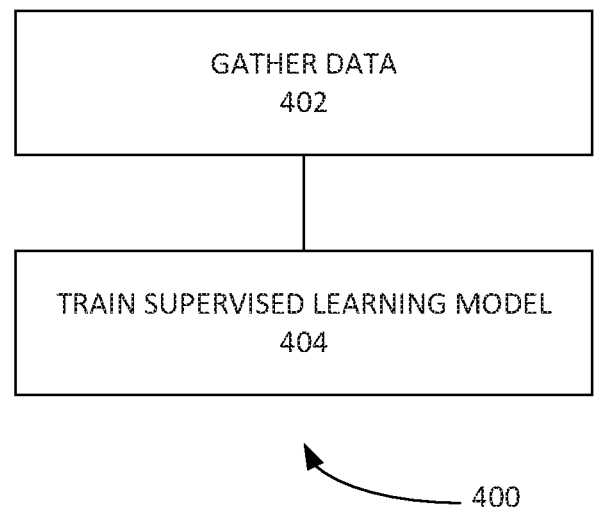
FIG. 4 is a block diagram illustrating an example method of the anomalous user session detector of FIG. 3.

FIG. 4 illustrates an example method 400 for use with the anomalous user detector 300, such as the training component 302. The anomalous user detector 300 via the training component 302 can gather and collect data regarding the logon session of an authorized user at 402. For example, the training component 302 can collect a sequence of operations performed by users of the cloud tenant applied to a resource. In one instance, the sequence of operations includes a sequence of process-creation events in a remote desktop logon session to a virtual machine. Another instance can include a sequence of resource CRUD operations on logs. In addition to the operations, the data regarding the logon session at 402 includes user information, such as user access credentials, to identify an authorized user.

Per cloud tenant, the training component 302 can train a supervised learning model to identify the authorized behavior based on the sequence of operations of the logon session at 404. For example, the training component 302 can train a classification model from the data regarding the logon sessions to determine the authorized user according to the operations at. In one example, a multi-label classification process in machine learning is applied to the data regarding the logon sessions to determine the user according to the operations. The amount of data collected at 402 to be trained at 404 can be vast. The ability to identify the authorized user from the vast amount of data can be enhanced via a complex Deep Neural Network. In one example, the training component 302 can implement Long Short-Term Memory (LSTM) as an artificial recurrent neural network architecture to train the identification of the authorized user with the sequence of operations in a logon session, which can include time-sequenced operations, or operations indexed in order of time. The training at 404 can be performed on batch data, in which the data samples of the sequence of operations are collected at 402 before the training at 404 begins or on on-line data in which the training at 404 incrementally builds a model as data is received over time.

Figure 5:
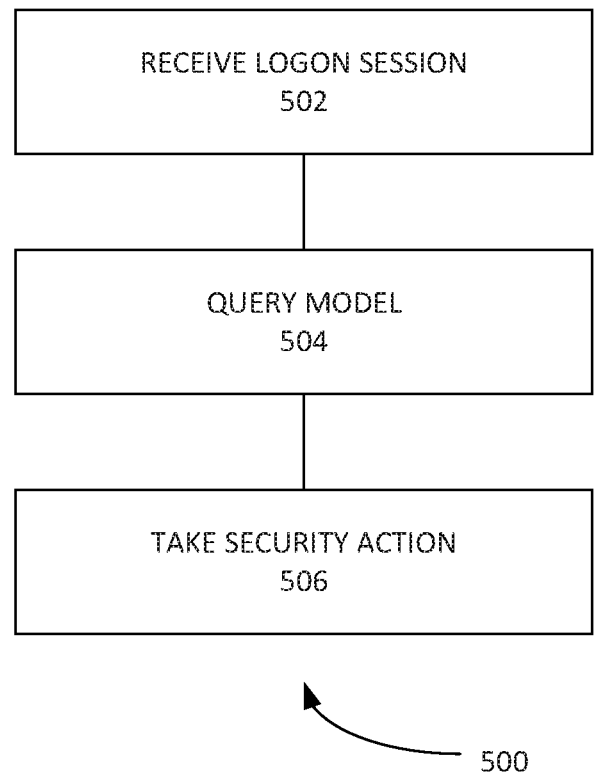
FIG. 5 is a block diagram illustrating an example method of the anomalous user session detector of FIG. 3.

FIG. 5 illustrates an example method 500 for use with the anomalous user detector 300, such as the detection component 304. Information regarding a logon session is received at 502. In one example, the information regarding the logon session is an active logon session currently in progress, and example method 500 can be performed as part of a threat detection service. In another example, the information regarding the logon session is a past logon session, and example method 500 can be performed as part of a forensics analysis. The information regarding the logon session can include the sequence of operations performed in the logon sessions along with an identity of an alleged user. The information regarding the logon session received at 502 is used to query the pre-trained model, such as a model generated via method 400, to determine the prospect that the user is the authorized user at 504. In one example, the query can determine the likelihood that the received logon session is to the authorized user. Depending on the determined likelihood that received logon session is to the authorized user, a security action may be taken at 506. For example, no security action may be taken if the determined likelihood is within a selected first threshold amount. A first security action may be taken if the determined likelihood is outside of the first threshold amount or between the first threshold amount and within a second threshold amount. Another security action may be taken if the determined likelihood is outside of the second threshold amount.

Figure 6:
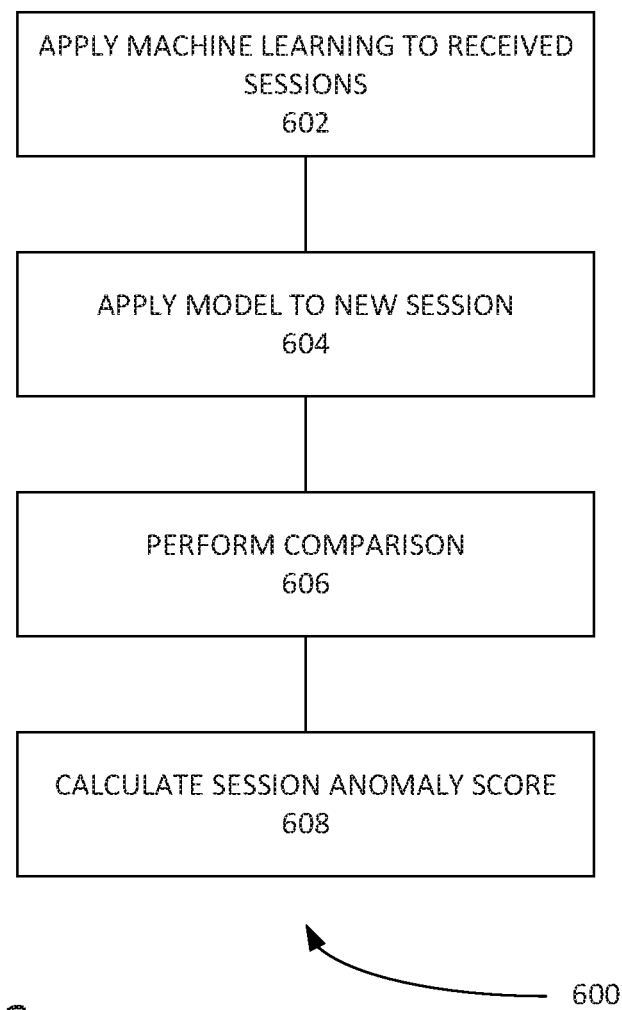
FIG. 6 is a block diagram illustrating an example method of the anomalous user session detector of FIG. 3.

FIG. 6 illustrates an example method 600 for use with the anomalous user detector 300. Method 600 can include features of methods 400 and 500. In example method 600, a machine learning model is applied to learn the behavior of an authorized user based on received session of the authorized user at 602. The learned model obtained at 602 is applied to a received (new) logon session to identify the user of the (new) session at 604, such as the most likely user. The received (new) logon session is compared with the learned model with a distance metric at 606. In one example, the comparison at 606 includes a dimensional reduction technique for the users and then the distance metric can include a cosine distance between the authorized user of the model and the user of the received logon session. A session anomaly score is determined based on the distance metric between the authorized user and the user of the received session at 608, and the session anomaly score can be applied to determine whether to take additional security action.

The example anomalous user detector 300 and methods 400, 500, 600 can be implemented to include a combination of one or more hardware devices and computer programs for controlling a system, such as a computing system having a processor and memory, to perform methods 400, 500, 600. For instance, anomalous user detector 300 and methods 400, 500, 600 can be implemented as a computer readable medium or computer readable storage device having set of executable instructions for controlling the processor to perform the methods 400, 500, 600. The anomalous user detector 300 and methods 400, 500, 600 can be included as a service in a cloud environment and implemented on a computing device 100 in a datacenter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of detecting an anomalous user session, the method comprising:

gathering a sequence of operations from a plurality of operations performed in a logon session for an authorized user;

training a supervised learning model to identify the authorized user from the sequence of operations from the plurality of operations performed in the logon session; and detecting an anomalous session by querying the supervised learning model.

2. The method of claim 1 wherein the gathering includes collecting process-creation events.

3. The method of claim 1 wherein the gathering includes create, read, update and delete operations.

4. The method of claim 1 where the sequence of operations is attributed to the authorized user via access credentials.

5. The method of claim 1 wherein the training includes machine learning behavior of the authorized user in the logon session.

6. The method of claim 5 wherein the machine learning includes a multi-label classification process.

7. The method of claim 6 wherein multi-label classification process is implemented with a long short-term memory architecture.

8. The method of claim 1 wherein the detecting includes determining the prospect that a user of the anomalous session is the authorized user.

9. The method of claim 1 comprising:

taking a security action if the prospect that the user of the anomalous session is not the authorized user is outside of a threshold amount.

10. The method of claim 9 wherein the security action includes terminating the anomalous session.

11. A computer readable storage device to store computer executable instructions to control a processor to:

gather a sequence of operations from a plurality of operations performed in a logon session for an authorized user;

train a supervised learning model to identify the authorized user from the sequence of operations from the plurality of operations performed in the logon session; and detect an anomalous session by querying the supervised learning model.

12. The computer readable storage device of claim 11 wherein the instructions to gather the sequence of operations includes instructions to collect data regarding a sequence of operation performed by the authorized user of a cloud tenant applied to a resource.

13. The computer readable storage device of claim 11 wherein sequence of operations includes create, read, update, and delete operations.

14. The computer readable storage device of claim 11 wherein the authorized user is identified by access credentials.

15. The computer readable storage device of claim 11 wherein the instructions to train the supervised learning model includes instructions to apply a multi-label classification process in machine learning to the sequence of operations.

16. The computer readable storage device of claim 15 wherein the multi-label classification model is performed with a deep neural network.

17. A system, comprising:

a memory device to store a set of instructions; and a processor to execute the set of instructions to:

gather a sequence of operations from a plurality of operations performed in a logon session for an authorized user;

train a supervised learning model to identify the authorized user from the sequence of operations from the plurality of operations performed in the logon session; and detect an anomalous session by querying the supervised learning model.

18. The system of claim 17 wherein the instructions are implemented with a security service of a cloud environment.

19. The system of claim 18 wherein the security service protects cloud-based assets and resources.

20. The system of claim 17 including instructions to take a security action if a prospect that the user of the anomalous session is not the authorized user is outside of a threshold amount.

* * * * *